United States Patent [19]

Stoermer

[11] 3,976,218
[45] Aug. 24, 1976

[54] SAFETY APPARATUS FOR A PRESSURE COOKER

[75] Inventor: William F. Stoermer, Centerville, Ohio

[73] Assignee: Henny Penny Corporation, Eaton, Ohio

[22] Filed: Aug. 11, 1975

[21] Appl. No.: 603,673

[52] U.S. Cl. ................................. 220/316; 99/403
[51] Int. Cl.² ..................... B65D 45/00; A47J 37/12
[58] Field of Search ............... 220/316, 314; 99/403

[56] References Cited
UNITED STATES PATENTS

| 1,659,202 | 2/1928 | Jewell | 220/316 |
| 1,858,013 | 5/1932 | Heins | 220/316 |
| 2,629,514 | 2/1953 | Savolainen | 220/314 |

Primary Examiner—William Price
Assistant Examiner—Steven M. Pollard
Attorney, Agent, or Firm—Wood, Herron & Evans

[57] ABSTRACT

A pressure cooker has a receptacle and a lid having a gasket around its perimeter for engagement with the upper edge of the receptacle. A bar extends across the lid and is connected to the receptacle. A spindle is threaded in the bar and engages the lid to force the lid gasket against the receptacle to seal the pressure cooker. The lid has a flexible inner liner which functions in part as a diaphragm to operate an interlock to block the rotation of the spindle when the pressure within the receptacle exceeds a predetermined value. The spindle also has a cooperating safety nut which is normally non-functional but in the event of the wearing of the operational threads associated with the spindle will warn the operator of that condition and in the event of the stripping of the operational threads will prevent the lid from opening more than a very small amount.

8 Claims, 5 Drawing Figures

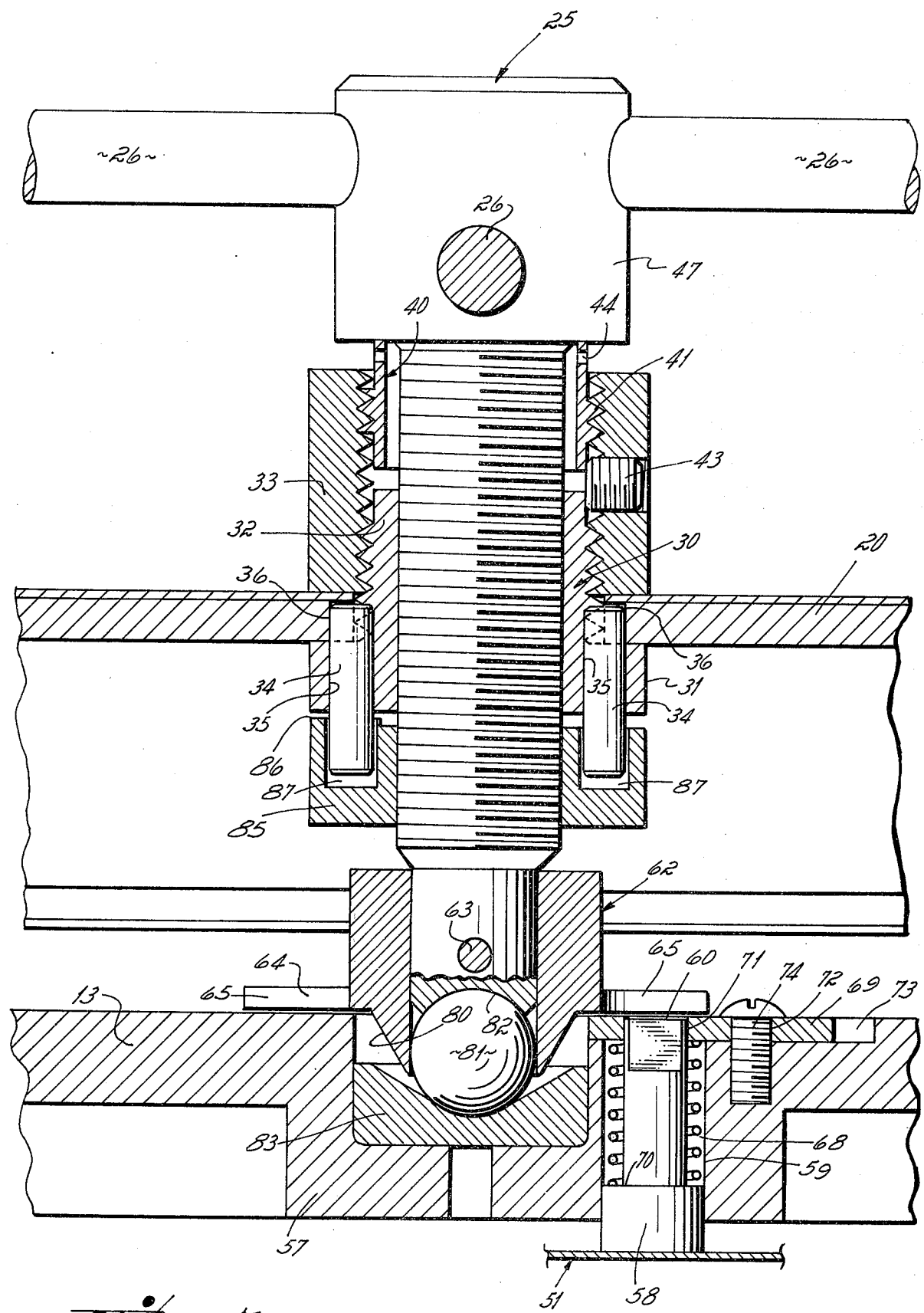

SAFETY APPARATUS FOR A PRESSURE COOKER

This invention relates to a pressure vessel, and more particularly, the invention is directed to a safety mechanism which prevents the opening of the lid of the vessel when the materials in the vessel are under high pressure. The invention is an improvement in pressure cookers of the type disclosed in U.S. Pat. Nos. 2,914,063, 3,159,095 and 3,314,416.

The invention has been employed principally in a pressure cooker wherein chicken or comparable foods are cooked in oil and are maintained under pressure. Under cooking conditions, the moisture in the food is released into the oil but is kept from expanding by the internal pressure of the cooker. If the lid of the receptacle should be removed abruptly when the temperature and pressure are high, the vapor pressure of the moisture entrapped in the oil immediately expands and explodes the hot oil out of the receptacle opening with consequent considerable danger to the operator.

An objective of the present invention has been to provide an interlock between the lid and receptacle which prevents the removal of the receptacle lid by the operator when the pressure within the receptacle is above a dangerous preselected level.

In accordance with the invention, the cooker receptacle has a lid which is adapted to engage the upper edge of the receptacle. A bar extends across the lid and is connected at each end to the receptacle. A spindle is threaded in the bar and when turned in a first direction presses against the lid to force the lid down upon the receptacle to form a pressure-tight seal. A gasket is provided around the perimeter of the lid to form the seal with the receptacle. The lid has a liner covering its inner surface, the liner serving partly as a diaphragm which engages a pin projecting through a hole in the lid. The liner also keeps the interlock mechanism, including the pin, from being exposed to the oil in the cooker. When the pressure within the receptacle exceeds a predetermined level, the liner forces the pin outwardly of the lid. The spindle has a locking collar with a plurality of holes alignable with the pin. When the pin is forced outwardly, it is thrust into one of the holes and locks the spindle from turning in a lid-opening direction. Preferably, the pin has a beveled upper surface which permits the spindle to turn in a lid-closing direction even while the cooker is under pressure.

Another objective of the invention has been to provide an assembly structure for the pin which provides assurance that when assembled, the beveled surface faces in the proper direction to permit rotation of the spindle in a lid-closing direction but to block rotation of the spindle in an opening direction when the cooker is under pressure.

Another objective of the invention has been to provide a mechanism which eliminates any hazard accompanying the wearing of the threads in which the spindle rotates and which might result in the inadvertent blowing the lid open. To this end, a safety nut is threaded onto the spindle and is normally non-operational, that is to say, it does not receive at its threads the load on the spindle. However, the safety nut is slightly spaced from a primary nut which is secured to the bar. If the threads on the primary nut should strip, the lid could not be blown free from the receptacle, but rather would be blocked by the safety nut engaging the primary nut.

Another feature of the invention has been to provide the safety nut with a shoulder so that in the event that the threads of the primary nut become worn, the safety nut will be drawn into engagement with the primary nut and the shoulder will cause the safety nut to cock with respect to the spindle, thereby causing it to bind and warning the operator that the primary nut has become worn and should be replaced.

The several features and objectives of the present invention will become more readily apparent from the following detailed description taken in conjunction with the accompanying drawings in which:

FIG. 5 is a cross-sectional view taken along lines 5—5 of FIG. 4.

Figure 1:
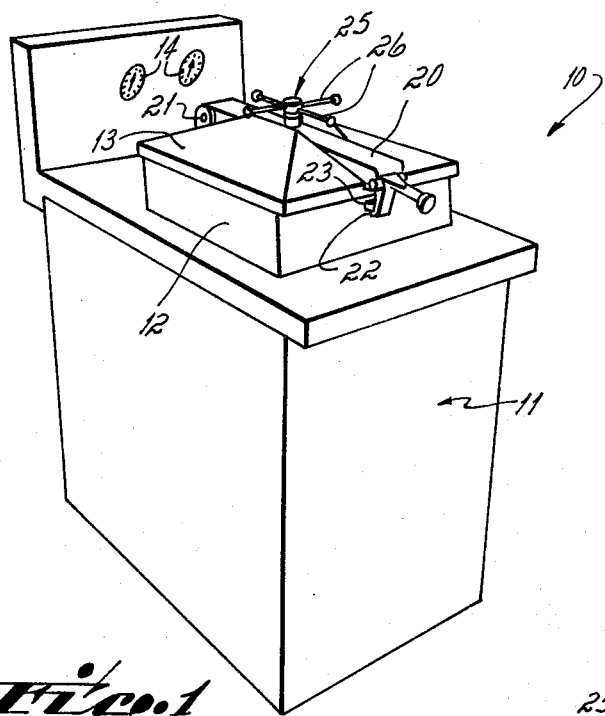
FIG. 1 is a perspective view of a pressure cooker employing the present invention.

Referring to FIG. 1, a pressure cooker 10 includes a cabinet structure 11, a receptacle 12 mounted on the cabinet structure and a lid 13 which closes the receptacle. Suitable pressure and temperature gauges 14 are provided to assist in the operation of the cooker.

Figure 2:
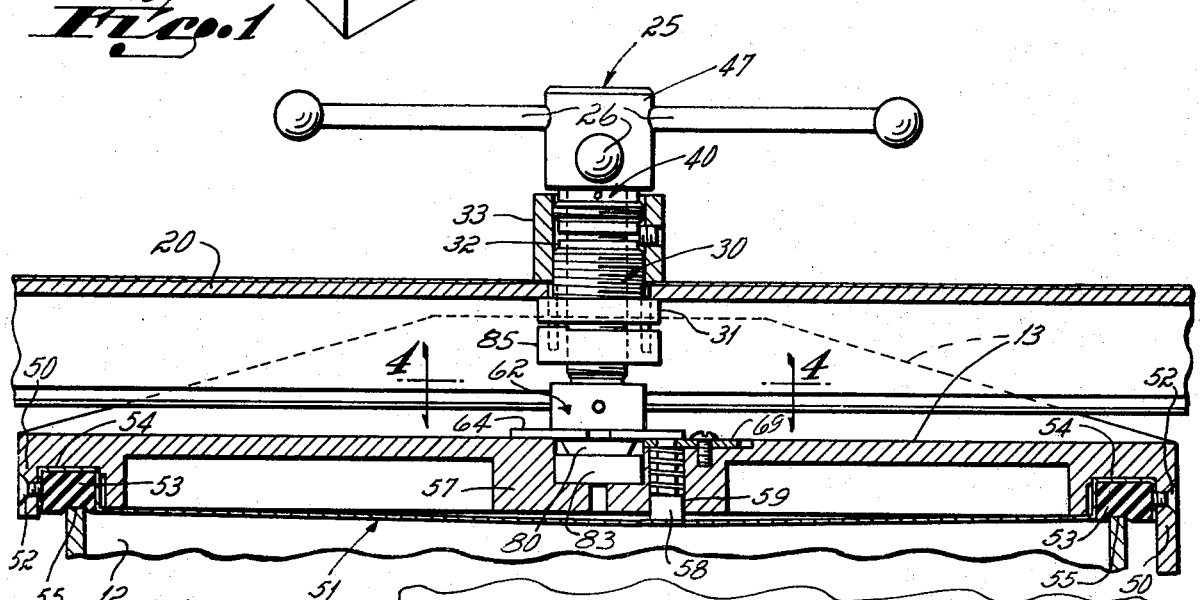
FIG. 2 is a cross-sectional view taken along lines 2—2 of FIG. 1.

Referring to FIGS. 1 and 2, the lid 13 is secured to the receptacle 12 by a bar 20 which is connected by a hinge 21 to one end of the receptacle and is connected by a pivoted latch 22 to an abutment 23 on the other end of the receptacle. The bar 20 has a spindle 25 threaded in it, the spindle having at its upper end handles 26 projecting radially from it to enable it to be rotated.

Figure 3:
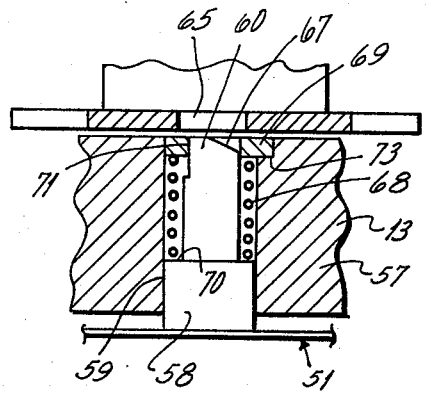
FIG. 3 is an enlarged fragmentary view showing the spindle portion of FIG. 2 in more detail.

As shown in FIGS. 2 and 3, the spindle is threaded in a bronze primary nut 30 having a flange 31 lying underneath the bar 20 and a hub 32 projecting through the bar and above it. A stop collar 33 is threaded on the exterior surface of the hub 32 and clamps the primary nut 30 to the bar 20. A pair of pins 34 project through holes 35 in the primary nut and engage a recess 36 in the bar 20 to block rotation of the primary nut with respect to the bar. Thus, the stop collar 33 blocks axial movement of the primary nut 30, and the pins 34 prevent rotational movement of the primary nut 30 with respect to the bar.

An adjustment stop 40 which has an exteriorly threaded boss 41 is threaded into the stop collar. Its axial position with respect to the stop collar can be varied by rotation of the adjustment stop with respect to the stop collar. A set screw 43 is threaded into the stop collar and bears against the lower edge of the adjustment stop and the upper edge of the hub 32 of the primary nut, thereby locking the primary nut, stop collar and adjustment stop together when the elements are properly assembled.

The adjustment stop can be axially adjusted by backing off the set screw 43 and rotating the adjustment stop with respect to the stop collar by means of a small tool projecting into a recess 44 in the adjustment stop. The spindle 25 has a hub 47 which engages the top surface of the adjustment stop to block further rotation of the spindle. The elements, particularly including the adjustment stop, are adjusted so that when the hub 47 engages the adjustment stop, a proper amount of pressure is applied on the lid 13 to seal it to the receptacle 12.

The lid 13 has downwardly depending flanges 50 which receive the marginal edges of a liner 51. Screws 52 spaced around the perimeter of the lid secure the liner in position. A flexible gasket 53 is disposed in the U-shaped edge portion 54 of the liner 51 and engages the upper edge 55 of the receptacle to seal the lid to the receptacle.

Figure 4:
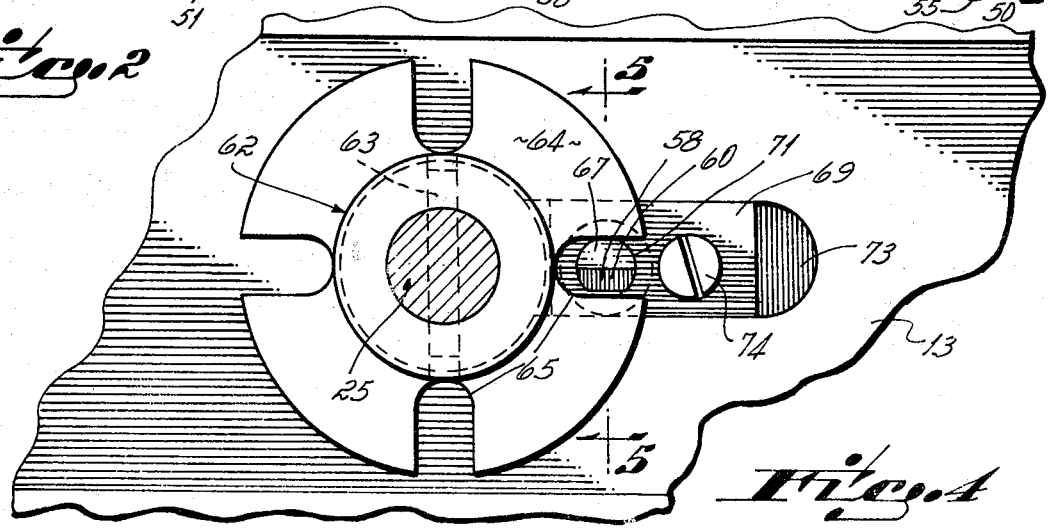
FIG. 4 is a cross-sectional view taken along lines 4—4 of FIG. 2.

The liner is flexible and acts as a diaphragm which is normally spaced from the center portion 57 of the lid. A pin 58 is slidably mounted in a bore 59 projecting through the center portion of the lid. The pin has an upper end 60 which is projectable above the upper surface of the lid when pressure within the receptacle causes the liner 51 to force the pin outwardly. A lock collar 62 is secured by a pin 63 to the lower end of the spindle 25. The lock collar has a circular flange 64 having a plurality of radially oriented slots 65, four for example, spaced around its periphery, the slots 65 being alignable with the upper end 60 of the pin 58. When the pin is forced outwardly by the internal pressure on the liner, it drops into one of the slots and blocks rotation of the lock collar and hence the spindle in a counterclockwise or opening direction. As shown in FIGS. 4 and 5, the pin has a beveled surface 67 which permits the collar and hence the spindle to rotate in a clockwise direction which is the lid-closing direction.

A compression spring 68 is positioned between a plate 69 and a shoulder 70 on the pin so as to urge the pin 58 into an inoperative position. The plate 69 has, as shown in FIG. 4, a hole 71 with a flat portion which mates with a flat surface on the pin 58. Further, the hole 71 as well as a screw hole 72 are offset from the center line of the plate 69. The plate 69 fits into a notch 73 formed in the upper surface of the lid and overlying the bore 59. A screw 74 threaded into hole 72 secures the plate in the notch. The combination of the offset relationship of the screw hole 72, bore 59 and the mating configuration of the hole 71 and surface of the pin 58 provides assurance that when the locking pin 58 is assembled, it will be properly oriented to permit rotation in a lid-closing direction and to block rotation in a lid-opening direction when the receptacle is under pressure.

The locking collar 62 has a downwardly projecting edge 80 which receives a steel ball 81, the edge 80 being staked around a portion of the steel ball to retain the steel ball in engagement with a spherical surface 82 on the lower edge of the spindle. The ball engages a ball seat 83 mounted in the upper surface of the lid 13. Thus, the ball forms an antifriction engagement of the spindle with the lid.

A safety nut 85 is threaded on the lower end of the spindle 25 and has an upwardly projecting shoulder 86 spaced a very slight distance from the lower end of the bronze primary nut 30. The pin 34 which locks the primary nut 30 to the bar 20 projects into a bore 87 in the upper surface of the safety nut 85 and prevents the safety nut from rotating when the spindle rotates with respect to the primary nut 30. Thus, the safety nut remains very slightly spaced from the primary nut, that is, about 1/32 inch.

If the threads on the primary nut 30 should become weakened after use, and the force of the pressure within the pressure cooker causes them to strip abruptly, the spindle will be rapidly driven upwardly by the force on the lid, but the safety nut will engage the primary nut after 1/32 inch of travel, thereby permitting the lid to open only very slightly and without any hazard to nearby personnel.

Further, if the threads on the bronze nut become worn so as to take up the distance between the primary nut and the safety nut, the safety nut will move into engagement with the primary nut and the projecting shoulder 86 will cause the safety nut to cock, thereby causing it to bind with respect to the threads on the spindle. Thus, the operator will be warned by the considerably increased force required to rotate the spindle that the primary nut is worn and due for replacement.

In the operation of the invention the lid is placed on the receptacle with the gasket 53 in engagement with the upper edge 55 of the receptacle. The bar 20 is swung into position and latched by handle 12. The spindle is rotated clockwise by rotating the arms 26 attached to it. The threaded relationship between it and the primary nut 30 causes the spindle to drive the ball 81 against the ball seat 83 and force the lid gasket into pressure sealed engagement with the upper edge of the receptacle. The rotation of the spindle will be stopped by the adjustment collar engaging the shoulder on the hub of the spindle to avoid the receptacle edge cutting into the gasket 53. If, after use, the gasket becomes worn so that it does not hold the pressure, the adjustment stop can be lowered slightly with respect to the primary nut to increase the pressure of the gasket on the receptacle edge.

As soon as pressure builds up in the cooker, the liner 51 will flex upwardly causing the pin 58 to rise into operative engagement with the flange 64 of the collar 62 mounted on the spindle. The pin will pop into one of the holes 65 and thus prevent the collar and spindle from being rotated in a counterclockwise direction to inadvertently open the lid while the receptacle is under pressure.

If the lid has not been clamped tightly enough, steam might be seen escaping and it would be desired to take one more quarter of a turn on the handle to complete the tightening of the lid. This can be done even though the pin is in its operative position because of the tapered surface 67 on the pin which permits a ratchet-like movement of the collar with respect to the pin.

When the lid is to be opened, the pressure within the receptacle is relieved by controls not described. Upon relief of the pressure, the compression spring 68 forces the pin 58 downwardly or toward the receptacle to permit the spindle to be rotated in a counterclockwise or opening direction.

I claim:

1. In pressure cooking apparatus having a receptacle, a lid adapted to be mounted on the receptacle, a bar extending across the lid and connectable to the receptacle to secure the lid to the receptacle and a spindle threaded in said bar and engageable with said lid to force said lid tightly against said receptacle, the improvement comprising, a pressure operated interlock between said lid and said spindle to block rotation of said spindle in a lid-opening direction when the pressure within said receptacle exceeds a predetermined amount, said interlock comprising, a pin slidably mounted in said lid, a diaphragm liner on the inside of said lid supporting said pin, a lock collar on said spindle having at least one hole engageable by said pin when said diaphragm, under pressure within said receptacle, forces said pin toward said collar.

2. Apparatus as in claim 1 in which said pin has a beveled surface facing said lock collar, said beveled surface permitting said spindle to rotate in a first direction to tighten said lid against said receptacle and blocking rotation of said spindle in the opposite direction.

3. Apparatus as in claim 2 further comprising means for assembling said pin in said lid to orient the beveled surface on said pin only in the proper direction.

4. Apparatus as in claim 3 in which said assembling means comprises a rectangular notch in the outer surface of said lid, a plate positionable in said notch and having a hole through which said pin passes, said pin and hole having mating surfaces permitting only one orientation of said pin, and means for mounting said plate in said notch in only one orientation.

5. In pressure cooking apparatus having a receptacle, a lid adapted to be mounted on the receptacle, a bar extending across the lid and connectable to the receptacle to secure the lid to the receptacle and a spindle threaded in said bar and engageable with said lid to force said lid tightly against said receptacle, the improvement comprising,
   a pressure operated interlock between said lid and said spindle to block rotation of said spindle in a lid-opening direction when the pressure within said receptacle exceeds a predetermined amount,
   a first nut secured in said bar into which said spindle is threaded,
   a safety nut between said first nut and said lid and spaced slightly from said first nut, said safety nut being threaded on said spindle and being connected to said first nut,
   whereby, if the threads on said first nut become stripped, said lid begins to blow off said receptacle, said safety nut will block substantial movement of said lid by engaging said first nut.

6. Apparatus as in claim 5 wherein said safety nut has a shoulder facing said first nut whereby if said threads on said first nut become worn sufficiently to close the gap between said nuts, said first nut, engaging said shoulder, will cock said safety nut causing it to bind, thus warning the operator of a dangerous condition.

7. In pressure cooking apparatus having a receptacle, a lid adapted to be mounted on the receptacle, a bar extending across the lid and connectable to the receptacle to secure the lid to the receptacle and a spindle threaded in said bar and engageable with said lid to force said lid tightly against said receptacle, the improvement comprising,
   a pressure operated interlock between said lid and said spindle to block rotation of said spindle in a lid-opening direction when the pressure within said receptacle exceeds a predetermined amount,
   a ball mounted on the end of said spindle,
   and a ball seat formed in said lid to receive said ball and to provide an antifriction bearing surface between said spindle and said lid.

8. In pressure cooking apparatus having a receptacle, a lid adapted to be mounted on the receptacle, a bar extending across the lid and connectable to the receptacle to secure the lid to the receptacle and a spindle threaded in said bar and engageable with said lid to force said lid tightly against said receptacle, the improvement comprising,
   a pressure operated interlock between said lid and said spindle to block rotation of said spindle in a lid-opening direction when the pressure within said receptacle exceeds a predetermined amount,
   a nut mounted on said bar between said lid and bar and having a hub projecting through said bar,
   a stop collar threaded on said hub to secure said nut to said bar,
   an adjustment stop threaded on said stop collar,
   means for fixing said adjustment stop on said stop collar,
   and an abutment on said spindle engageable with said adjustment collar to limit movement of said spindle with respect to said lid.

* * * * *